July 12, 1955

E. B. ROBINSON

2,712,778

IMPROVEMENTS IN AND RELATING TO THE PRODUCTION
OF HELICALLY WOUND CONTAINERS

Filed May 29, 1952

ERNEST BRADBURY ROBINSON
Inventor

By Howson and Howson
His Attorneys

Inventor
ERNEST BRADBURY ROBINSON
By Howson and Howson
His Attorneys

ERNEST BRADBURY ROBINSON
Inventor

By Howson and Howson
His Attorneys

July 12, 1955  E. B. ROBINSON  2,712,778
IMPROVEMENTS IN AND RELATING TO THE PRODUCTION
OF HELICALLY WOUND CONTAINERS
Filed May 29, 1952  7 Sheets-Sheet 6

ERNEST BRADBURY ROBINSON
Inventor

By Howson and Howson
His Attorneys

United States Patent Office 2,712,778
Patented July 12, 1955

2,712,778

IMPROVEMENTS IN AND RELATING TO THE PRODUCTION OF HELICALLY WOUND CONTAINERS

Ernest B. Robinson, Ashgate, Chesterfield, England

Application May 29, 1952, Serial No. 290,697

17 Claims. (Cl. 93—80)

This invention is for improvements in and relating to the production of helically wound containers.

In my U. S. Patent application Ser. No. 726,467, filed February 5, 1947 which matured into Patent No. 2,623,445, of December 30, 1952, and which has been reissued as Reissue Patent No. 23,899 of November 23, 1954, there is described a method of producing helically wound tubing having on the exterior thereof a circumferentially disposed unitary pattern repeated along the length thereof which consists in winding an inner strip of ribbon helically on to a mandrel to form an inner tubular layer, taking a further strip or ribbon having the said pattern repeated diagonally along it, and winding said further strip helically to form an outer tubular layer with the pattern disposed in rings on its exterior.

There is also disclosed in said patent apparatus for producing the containers by the above method, comprising a mandrel, means for winding strip material helically thereon to form tubing, the surface of the strip material which forms the exterior of the containers having the unitary patterns printed thereon and a cutter or cutters adapted to operate at appropriate times by suitable mechanism co-operating with control features on the strip material. Said specification also discloses apparatus including a light sensitive cell and a source of light for illuminating it whereof the arrangement is such that the travel of the strip carried the control features through the light beam and thereby evokes a response from the cell which operates through electrical means to regulate severing by controlling operation of the cutter. The particular electrical means disclosed in said specification however is of such nature that the control means are in an operative state (such as to be ready for causing operation of the cutter or cutters) for periods of comparatively long duration.

The object of the invention is to ensure that, when required, the control means are not operated by every control feature, and also are not operated by means such for example as blemishes on the strip.

The invention provides apparatus for producing cylindrical containers comprising means for helically winding, on a mandrel, strip material incorporating unitary patterns, control features, and surplus trim portions to form tubing moving axially of the mandrel and having the unitary patterns, control features, and surplus trim portions repeated along the tubing, cutting mechanism, including a cutter adapted for traversing along the tubing and movable towards it for severing the tubing into bites, and control means for timing at least some of the cuts to be at surplus trim portions in predetermined relation to the wound patterns by reference to control features; in combination with preset means associated with the control means for rendering the latter inoperative for predetermined repeated periods.

The invention also consists in the provision of suitable means for causing the control means to be in alternatively operative and inoperative states for such periods as to ensure operation of the control means only by desired control features.

Said periods are conveniently such that the control means are rendered operative immediately before a control feature arrives at the location of a detector, are also rendered inoperative at a convenient time threafter (such for example as immediately the ensuing cut is completed) and remain inoperative until immediately before it is desired for the control means to be operated by another control feature.

The control means may be normally in said operative state, in which event said suitable means will be arranged to function in what may be termed a "negative" sense by controlling the periods during which the control means are in the non-operative state, or the control means may be normally in the non-operative state, in which event said suitable means will be arranged to function in the 'positive' sense by controlling the periods during which the control means are in the operative state.

Said suitable means may be arranged to cause the control means to be in the non-operative state for periods of such length that the control means are operated only by every control feature, or only by alternate control features, or only by any desired selection of the control features.

Conveniently electrical means are provided which includes a main circuit operable by the control features for controlling the cutter means and contacts are provided for opening and closing this main circuit; operating means are also provided for controlling said contacts to render the main circuit live or inert for desired periods according to the said desired periods during which the control means are to be in the operative and non-operative states. Said operating means may be conveniently electrical means which may consist of a subsidiary circuit for controlling said contacts for which purpose said subsidiary circuit may be opened and closed by means associated with the cutter or cutters and may include suitable electrical components such for example as a valve, relay, condenser and/or resistance, or the like. As an alternative to the subsidiary circuit the main circuit may be controlled by means co-operating for example with the end of the moving tube.

In one convenient arrangement a main relay and valve is provided in said main circuit for operating a solenoid to control the cutter or cutters and whereas according to said specification, re-setting of the aforesaid electrical means or part thereof is carried out by contacts associated with the travel of the cutter or the tube, according to the present invention the contacts are arranged in the circuit of a valve where they initiate the charge (or discharge) of a condenser which in turn governs the period that a further relay opens contacts contained in the anode circuit of the main relay thereby delaying re-setting for a desired period so that the control means is in the non-operative state for the desired period. By suitable variation of either the charging voltage, condenser capacity, or discharge resistance, or all three, the time before the main circuit is re-set can be varied at will and the control means thereby made to respond to every control feature, alternate control features, or selected control features according to requirements, and such that the control means is rendered operative immediately before a control feature arrives at the point of detection so as to avoid inaccurate operation of the cutter or cutters due say to blemishes or the like on the strip.

Another object of the invention is to provide generally improved apparatus comprising an adjustable cutter head mounted to slide along the tubing and pivot to and from the tubing laterally thereof, a rotatable cam device for operating the cutter head, variable drive means for driving the cam device constituting a regulating device for varying the timing relationship between the movement of the cutter mechanism and the continuous movement of the tubing, and means for stopping the cam device, in combination with adjustable detector means associated with the strip material, and means for starting the cam device at appropriate times under control of said detector device.

Gumming means may be provided and these means and the detector device are each conveniently carried by a table-like structure which is locatable in an appropriate position relatively to the winding mechanism, and the detector device is mounted for desired adjustment relatively to the control marks or the like.

The invention further provides in a method of producing cylindrical containers of predetermined length each having a helically wound unitary pattern thereon, comprising providing strip material bearing unitary patterns each approximately equal in wound length to a predetermined container length, control features, and surplus space material, helically winding the strip material on to a mandrel in the formation of tubing having the unitary patterns, control features, and surplus space material repeating along it, and simultaneously moving the tubing axially, and periodically cutting bites of the moving tubing; the steps of observing spaced control features during their travel and regulating the location of cuts, made in the moving tubing, by reference to such control features, and rendering intervening traveling control features inoperative to regulate cutting of the tubing.

The above and other features of the invention are disclosed in the detailed description given by way of example of the particular embodiments illustrated in the accompanying drawings in which.

Figure 1:
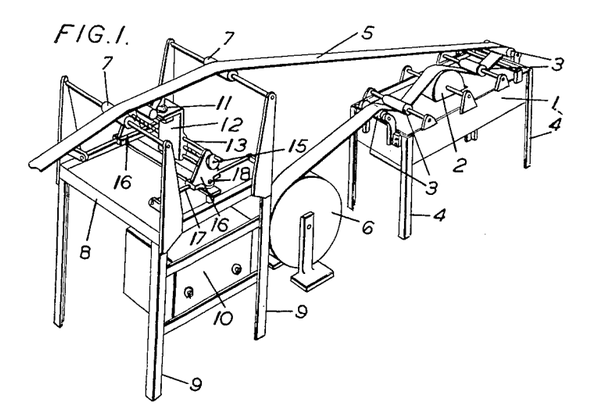
Figure 1 is a perspective view of a gumming unit and detector unit according to the invention.
Figure 2:
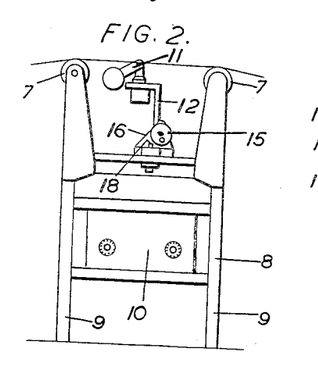
Figures 2 and 3 are elevational views of the detector unit.
Figure 3:
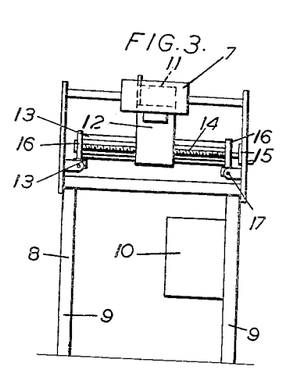
Figure 4:
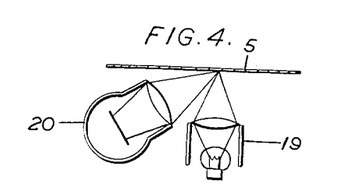
Figure 4 is an enlarged detail of a detector device.
Figure 14:
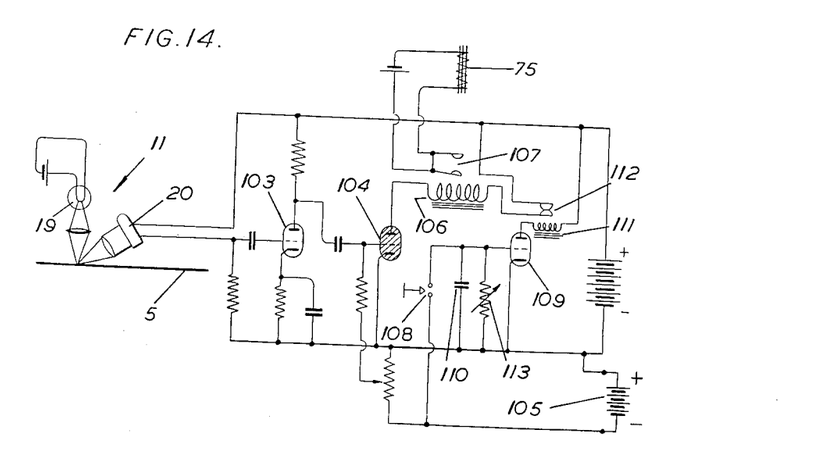
Figure 14 is a circuit diagram of control means.
Figure 15:
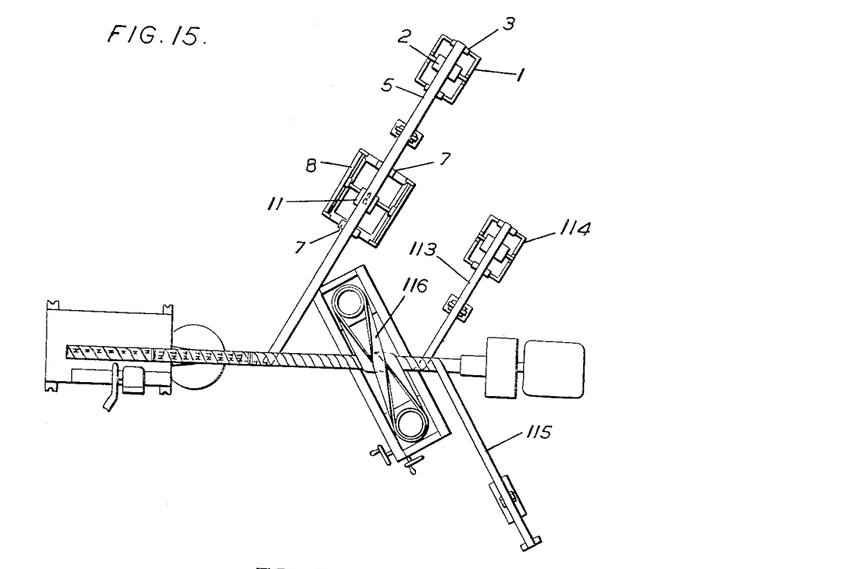
Figure 15 is a plan view of conventional winding mechanism employed in the machine and strip feeding means.
Figure 16:
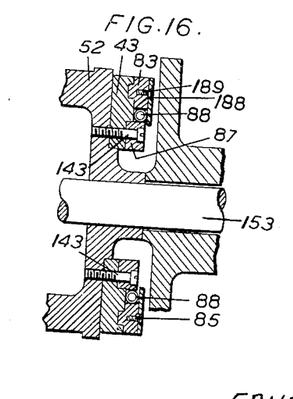
Figures 16 and 17 are enlarged sectional details from Figure 9.
Figure 17:
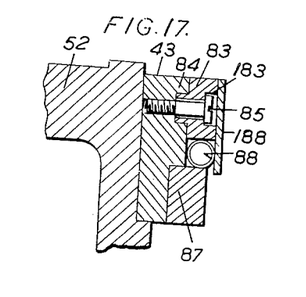

Referring now to Figures 1 and 15 of the drawings, a gumming unit 1 is provided of any convenient construction, incorporating a gumming roller 2, guide rollers 3 and supporting legs 4. Strip material 5 having the pattern printed thereon is drawn off from a supply 6 so that the pattern is lowermost at least when it passes over guide rollers 7 on a detector unit 8 (Figures 1 to 3). This unit 8 is mounted conveniently on legs 9 and incorporates suitable electric equipment (indicated at 10 and hereafter more fully described) and a detector device 11 which is mounted to be adjusted in all horizontal directions by being fixed to a bracket 12 slidable on guides 13 by lead screw 14 and hand wheel 15, to move transversely of the strip 5 and by said guides 13 and lead screw 14 being fixed to end brackets 16 slidably mounted on guides 17 to move in the direction of the length of the strip and be fixed in desired position by finger screws 18. Figure 4 illustrates a suitable detector device, consisting of a lamp 19 and photo electric cell 20, and shows the latter's relationship with the strip 5 when the strip has the pattern printed on the side which is lowermost, as previously mentioned, when passing the detector. The detector may be influenced by control features as referred to in Patent No. 2,623,443 and the detector may be arranged to be operated by features that are dark on a light background or vice versa as desired. Preferred electric control means illustrated in Figure 14 will be fully described hereafter.

In the example illustrated, there may be three strips as in the manner shown in Figure 15, the strip 5, in this example, having gum applied to it and the pattern printed on it, whilst the strip 113 is also gummed by passing through a gumming unit 114 but has no pattern on it. There is also a third strip 115 which does not have gum applied to it and is not patterned. Figure 15 also shows conventional winding means comprising an adjustable travelling endless belt 116 which winds the strips helically on a mandrel, the resultant tubing being fed to the cutting mechanism.

Referring now to the tube cutting machine illustrated in Figures 5 to 13 a suitable framework 21 (see particularly Figure 6) is provided to carry a cutter head 22 and cam means 23 to operate the head, it being understood (from Figure 15) that this structure shown in Figures 5 to 13 is a continuation of that structure shown in Figure 15 which incorporates a mandrel, on which the strip 5 is wound by the endless belt 116, suitable guides for the strip, and other devices (well known in tube winding machines) such for example as adjustment means for the belt tension.

The cutter head 22 (Figure 5) conveniently consists of a circular saw 24 rotatable by a motor 25 and having a shroud 26 the interior of which may be placed under suction so that the sawdust may be drawn off through a flexible pipe 27 to a suitable remote location. The cutter head 22 is conveniently carried by the motor 25, and the motor is slidably supported on a bracket 28 by guides 29 for initial setting of the saw relatively to the tube 30 being formed. The bracket 28 is freely pivoted on a rod 31 and is fastened by a bolt 32 (Figure 6) to an extension 33 which latter carries a truck 34 by movement of which the saw is moved laterally of the tube. The truck 34 rides in a slot 35 formed by a frame member 36 and this frame member includes a rod 37 (Figure 9) which is fixed in slide blocks 38, 39 and carries trucks 40 and 41 riding on disc cams 42 and 43 respectively. These cams 42, 43 effect the desired movements of the saw 24 laterally of the tube 30 and a manual adjustment may be effected by thumb screw 44 (Figure 5) which varies the relationship of the bracket 28 with the extension 33 as allowed by a slot 45. The slide blocks 38 and 39 and consequently the trucks 40, 41 are conveniently urged onto the cams by springs 40ª, 41ª, at each end of the rod 37.

For guiding the cutter head 22 along the tube 30 the said rod 31 is fixed in bearings 46, 47 (Figure 6) carried by a dovetail slide 48 (Figure 8) which is slidably mounted in a dovetail guideway 148 formed in a fixed part of the machine. The said rod 31 also extends through a fixed bearing bracket 49 (Figure 6) and carries a shock absorbing spring 50, whilst the projecting end of it is arranged to engage a switch-operating plunger 51 at the end of its stroke in the first direction of its movement lengthwise of the tube 30 as referred to in said Patent No. 2,623,443 for resetting electrical means hereafter referred to.

For traversing the cutter head said cam means 23 incorporates a drum like cam 52 (Figure 9) having an endless oblique groove 53 in which rides a truck 54 (Figure 8) carried by the dovetail slide 48. The drum cam 52 is freely mounted on a spindle 153 and this spindle 153 is continuously rotated through gears 55 (Figure 6), shaft 56 rotatable in ball bearings 57, friction discs 58, 59, and motor 60. In order that the traversing speed of the cutter mechanism can be synchronised with the rate of tube production, friction disc 58 is movable radially of disc 59 to adjust the speed of the drum cam and for this purpose the motor 60 is conveniently slidably mounted in guides 61 (Figure 7), and a hand wheel 62 and screwed rod 63 are provided. Friction gear 59 is slidably keyed on shaft 56.

Figures 5, 7, 8:
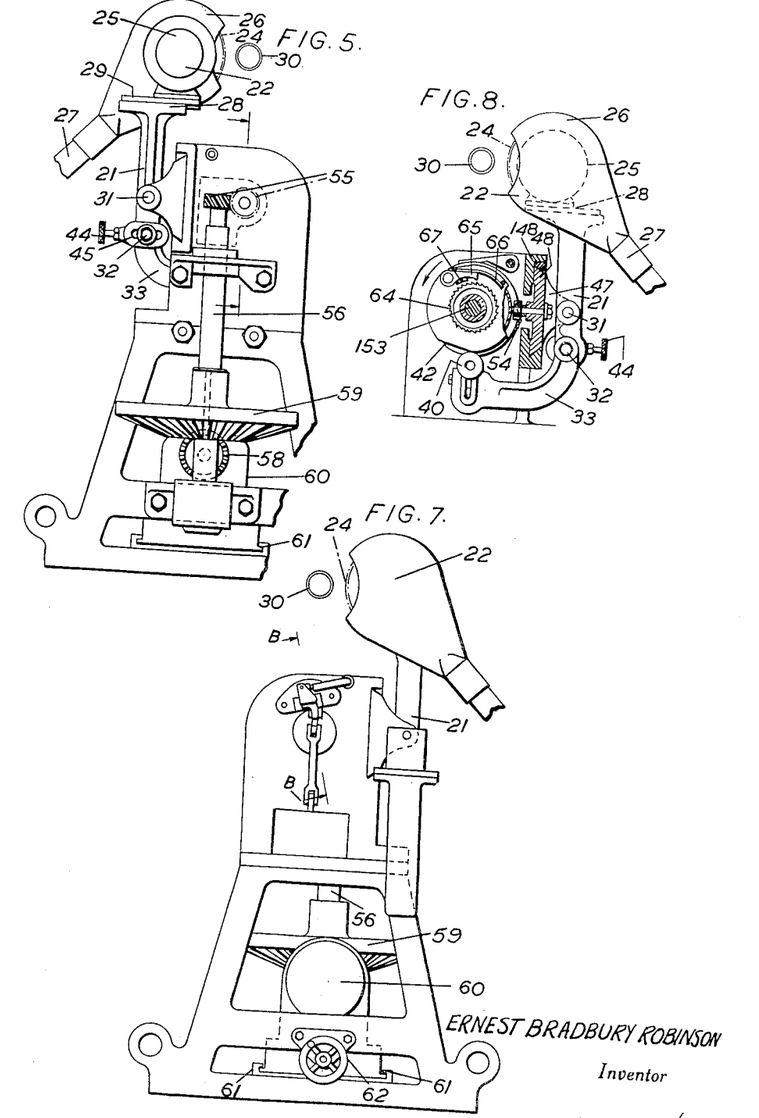
Figure 5 is one end view of the cutter part of a machine according to the invention.
Figure 7 is the other end view of the machine.
Figure 8 is one end part sectional view of can and cutter means according to the invention.
Figure 6:
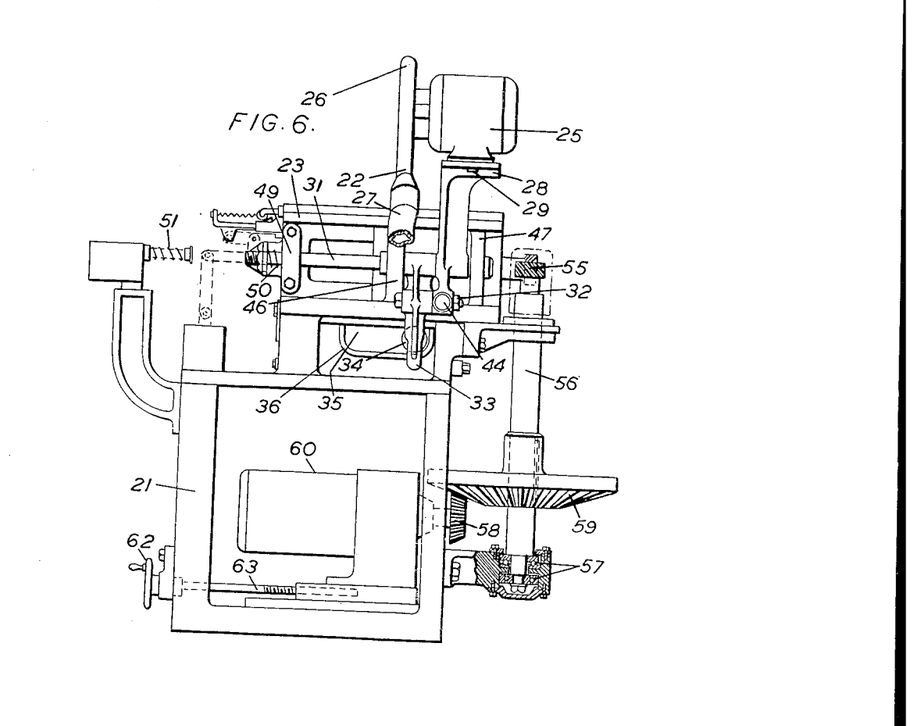
Figure 6 is a side view of said machine.
Figure 9:
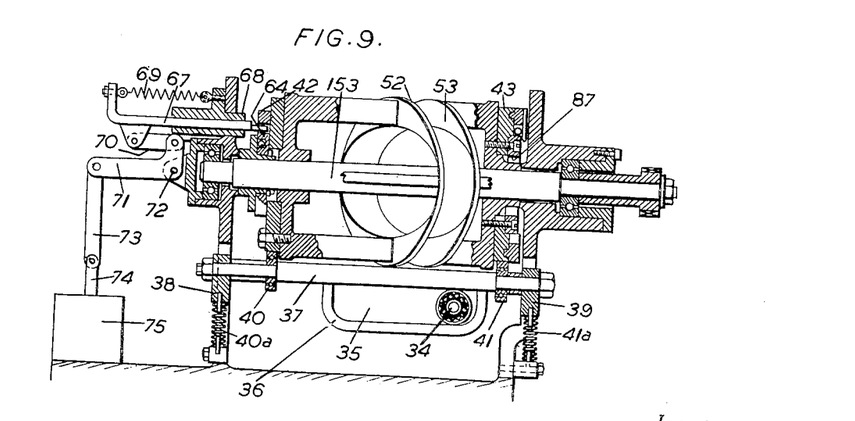
Figure 9 is a side section thereof.
Figure 10:
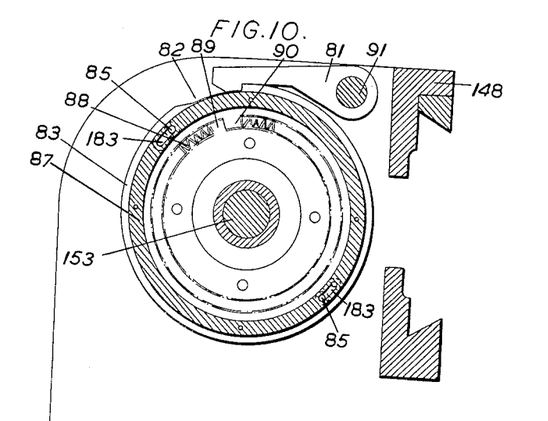
Figure 10 is the other end section thereof.
Figure 11:
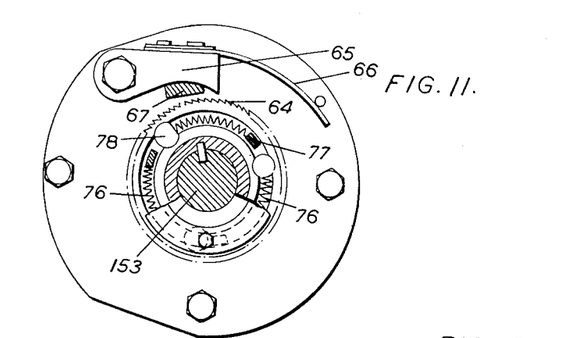
Figure 11 is an enlarged sectional detail of Figure 8.
Figure 12:
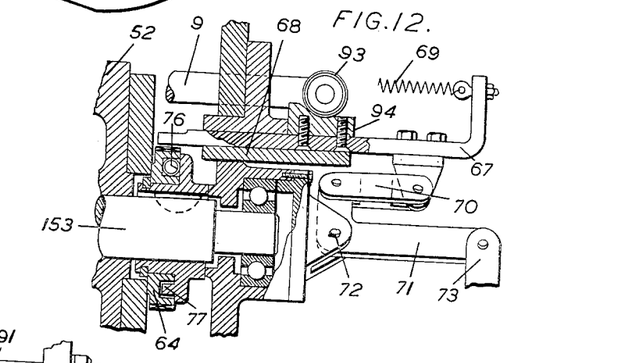
Figure 12 is an enlarged sectional elevation of the rear of the left hand end of Figure 9.
Figure 13:
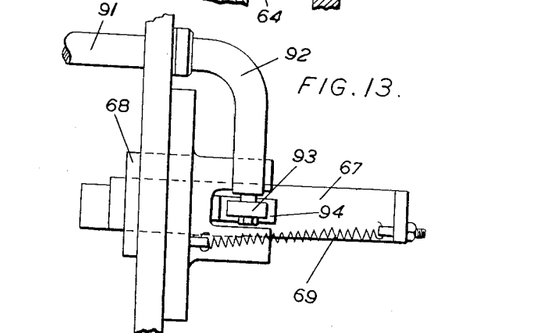
Figure 13 is a detail plan of Figure 12.

Motion is transmitted from the spindle 153 to the drum cam 52, for example, by a ratchet coupling (although other means such for example as a roller and wedge clutch means may be provided for the purpose) comprising a ratchet wheel 64 (Figures 8 and 9) fixed on and therefore rotatable with the spindle 153, and pawl 65 which is pivotally carried by the drum cam and is biassed by spring 66 towards engagement with the teeth of the ratchet wheel but normally held out of engagement therewith by a slidable catch 67 (Figures 8, 9 and 12). This slidable catch 67 is mounted to slide in guide 68 and is biassed by a spring 69 to a pawl-disengaging position; for withdrawing the slidable catch 67 to allow the pawl 65 to engage the ratchet teeth, the catch 67 is connected by a link 70 (Figure 9) to a bell crank lever 71, said lever 71 being pivoted at 72 and connected by link 73 to the core 74 of a solenoid 75.

The solenoid 75 is operated at the desired times by the detector as referred to in said Patent No. 2,623,443 and if desired means may be provided for absorbing the shock of starting the cam 52 such for example as springs 76 (Figure 11) positioned between parts 77 and 78 associated with the cam 52 and the ratchet wheel 64.

At the end of the cam 52 opposite to the ratchet coupling, means are conveniently provided for stopping the cam positively, it being understood that, as described in said Patent No. 2,623,443 the slidable catch 67 is made to return by its spring to its initial position when the cutter head 22 reaches the end of its stroke in the first direction (by engagement of the parts 50 and 51 in Figure 6) so that the pawl 65 is automatically disengaged from the ratchet wheel 64 at the end of one complete revolution of the cam. Said positive stopping means conveniently consist of a pivoted catch 81 (Figure 10) for engaging in a recess 82 in a ring 83. This ring 83 is mounted for limited rotation relatively to the cam in guides 84 (Figures 9, 10, 16, 17) on part 43 which latter is fixed to the cam 52 by screws 143; said ring 83 is connected to part 43 by headed screws 85 which extend through slots 183 in the ring 83 and screw into the part 43. There is also provided an inner ring 87 fixed to the cam 52 by said screws 143, whilst a coil spring 88 (for absorbing shock) is located in the annular recess between the rings (and is retained by a retaining ring 188 which is fixed by screws 189 to outer ring 83) and abuts at its end on lugs 89, 90 on the rings respectively; therefore the rings are carried round with the cam 52, but at the end of one revolution the catch 81 rides into the recess 82 and stops the outer ring 83 with the result that the inner ring 87 and cam 52 are stopped by the spring 88. The catch 81 must be released of course for starting the cam 52 again and for this purpose the catch 81 is conveniently fixed on a rod 91 which extends along the cam 52 and has a cranked end 92 (Figure 13) to which is attached a follower 93; this follower 93 rides on a wedge 94 which is fixed on the slidable catch 67 (see also Figure 12) so that when the slide 67 is withdrawn by the solenoid 75 to start the cam 52, the rod 91 is rocked by the cam-bit 94 to swing the catch 81 out of the recess 82 in ring 83.

The apparatus operates substantially in the manner described in said Reissue Patent No. 23,899 with the gumming unit and detector unit disposed as shown in Figure 1, the strip 5 leading from the detector unit to the winding machine and being wound if desired with an overlap and may be over another strip or strips leading from another supply.

Referring now to Figure 14 the photo-electric cell 20 is connected to a valve amplifier 103, which amplifies impulses from the cell and in turn impresses them on the grid of a gas relay valve 104 which is normally biased to an inert non-conducting state from a source of negative potential 105. The valve 104 carries a high speed magnetic relay 106 in its anode circuit with contacts 107 connected to energize the electro-magnet or solenoid 75 which releases the aforesaid slidable catch 67 to set the cutting gear in motion when the cell 20 sends an impulse to the valve 104 by virtue of a control mark on the strip arriving at the position of the cell 20.

The gas filled relay valve is unique for this purpose since it possesses the features of being triggered or fired from a small transient impulse of short duration with an almost inertialess response time and of remaining in the conducting state until reset by opening the anode circuit or making the anode negative with respect to the cathode potential.

This feature allows the solenoid circuit to be established for sufficient time to allow it to do its work even though the initiating impulse may be of only micro-second duration.

Whilst opening of the anode circuit to reset the relay has been carried out directly by operation of contacts associated with the travel of the cutter or the tube, it is found more convenient to employ similar contacts 108 to operate in the circuit of a further valve 109 where they initiate the charge (or discharge) of a condenser 110 which in turn governs the period that a further electro-mechanical relay 111 opens its contacts 112 contained in the anode circuit of the gas filled relay valve 104.

By suitable variation of either the charging voltage or the capacity of condenser 110 or variation of a discharge resistance 113, or all three, the time before the circuit is re-set can be varied at will and the equipment made to respond to every control feature, alternate control features, or every third control feature etc., according to the output requirements. In addition the control means can be made inert until just before the control feature arrives and consequent inaccurate operation due to marks or blemishes on the paper avoided.

The following two examples will explain the desirability of providing the above described means for obtaining controlled periods during which the control means are operative and inoperative (i. e. in addition to the general desirability of avoiding operation of the cutter or cutters by blemishes and the like on the strip), but it is to be understood that here may be other examples.

In Example 1, it is desired to produce rims say 3 inches long, and the desired patterns are printed in repeat on the strip by a printing cylinder. One control mark only is included in each length of strip printed by successive revolutions of the printing cylinder (this mark conveniently occupying a short length of tube say ¾-inches not forming part of a patterned rim), and as the circumference of the cylinder may be limited to say a maximum of 40-inches circumference proportionate limitation is imposed on the distances, between consecutive control marks as they appear/occur on the finished tube. In practice a typical relationship of circumference of cylinder to length of tube produced from a strip of the same length as the cylinder circumference is of the order of 2:1.

To continue our example, it would be convenient to print 6 patterns for each revolution of the cylinder, and control marks will appear on the tubing after each six patterns i. e. at 18¾ inch pitches. The length of tube cut off however may have to be in the region of 35 to 42-inches so as to provide an economic fill for a separate cutting up machine which cuts the tubes into individual 3-inch rims, so it would be necessary to cut off lengths of 37½ inches to achieve this purpose, this length containing the output of two revolutions of the printing cylinder. It thus follows that the control means must be ineffective on alternate control marks. Example 2 concerns rims that are of substantially the same length as the amount of tube which is usually wasted as trim and in this example part of the pattern is utilised as a control mark for detection purposes, and a whole rim is wasted as trim. It thus follows that the control means must be in the operative state for only one pattern in each length of tube cut off.

The photo-electric cell may if desired consist of a device of high impedance such as a vacuum or gas filled emission type photo-cell, or alternatively, a conduction type cell such as a Selenium cell (if desired with the addition of light filters).

The arrangement in Figure 14 is suitable for operating on control marks which are dark on a light background, and, for operating on light marks on a dark background, the respective positions of the cell 20 and resistance R in the circuit are reversed.

In the aforesaid particular description, it may be said that the control means is normally in an operative state and that the means described functions in what may be termed a "negative" sense by controlling the period during which the control means are in the non-operative state. However if desired the sense may be reversed, suitable means being provided for changing the control means from a normally non-operative state to an operative state. These means may for example consist of a device co-operating with the end of the moving tubing and this device may for example consist of a feeler, electric eye or the like arranged for operating electrical contacts such as to render the control means operative at required times, and suitable means being provided for maintaining the control means operative for a required period before it is rendered inoperative and maintained inoperative until said device is again operated.

Figure 18:
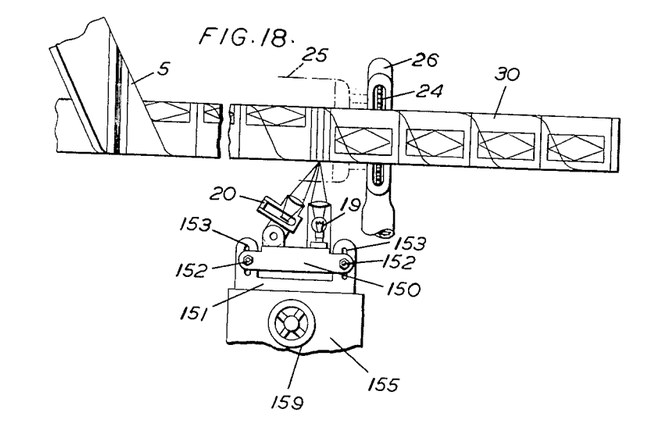
Figures 18 and 19 are detail views of a modified arrangement.
Figure 19:
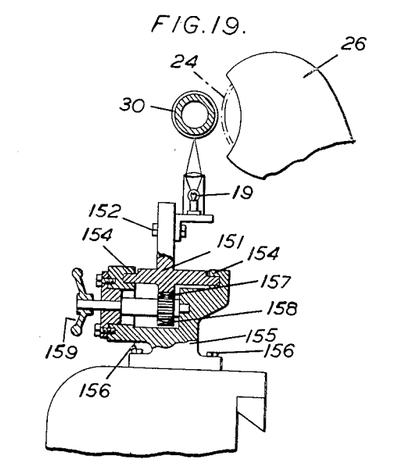

It is to be further understood that the pattern may be disposed on the strip or on any of the strips in such manner that the pattern would be presented either exteriorly or interiorly of the tubing, or both, and the strip or any of the strips may be of transparent material; it is also to be understood that detection may take place at any suitable location relatively to the strip material i. e. on either side of the strip before being formed into tubing, or exteriorly or interiorly of the tubing according to requirements; for example detection may take place on the underside of the strip as it travels to the mandrel as shown in Figures 1 to 4 or it may take place on the tubing as illustrated for example in Figures 18 and 19. Referring now to these figures the detection is on the underside of the tubing but it will be appreciated that the detection may be at any convenient location around the circumference of the tubing. Referring now to said Figures 18 and 19, the lamp 19 and photoelectric cell 20 are arranged to observe on the underside of the tubing for this purpose they are conveniently fixed on a bracket 150 and the bracket is adjustable in a slide support 151 by means of bolts 152 and slots 153. The slide 151 is adapted for horizontal adjustment in guides 154 formed in a support 155 which is fixed by bolts 156 to the frame of the cutting machine. The slide 151 is movable conveniently through the medium of rack 157 and pinion 158 by a hand wheel 159.

What I claim is:

1. Apparatus for producing cylindrical containers comprising means for helically winding, on a mandrel, strip material incorporating unitary patterns, control features, and surplus trim portions to form tubing moving axially of the mandrel and having the unitary patterns, control features, and surplus trim portions repeated along the tubing, cutting mechanism, including a cutter adapted for traversing along the tubing and movable towards it for severing the tubing into bites, and control means for timing at least some of the cuts to be at surplus trim portions in predetermined relation to the wound patterns by reference to control features; in combination with pre-set means associated with the control means for rendering the latter inoperative for predetermined repeated periods.

2. Apparatus as claimed in claim 1 wherein said periods are of such duration that he lengths of tubing produced therein each incorporates one or more of said control features not used for timing said cuts as and for the purpose described.

3. Apparatus as claimed in claim 1 wherein the control means are inoperative for repeated periods during production of those lengths of tubing between said control features.

4. Apparatus as claimed in claim 1 wherein the control means are inoperative for repeated periods during the production of lengths of tubing each incorporating at least one of the control features and one of the unitary patterns.

5. Apparatus as claimed in claim 1 wherein the repeated periods are of such duration that the lengths of tubing produced therein each incorporates at least two unitary pattens with a control feature and a surplus trim portion between them.

6. Apparatus for producing cylindrical containers of predetermined length each having a helically wound unitary pattern thereon, comprising means for winding helically on a mandrel strip material bearing a succession of features of unitary patterns each approximately equal in wound length to a predetermined container length, surplus trim portions of predetermined length for and surplus to each length of the strip material appropriate to form a given number of containers and control features to form tubing having the unitary patterns, surplus trim portions, and control features repeated along the tubing, means for simultaneously moving the tubing axially of the mandrel, cutting mechanism including a cutter traversing along the tubing and movable towards it for severing bites off the tubing as it is produced and control means for detecting a control feature and regulating severing by reference to a control feature and severing bites off the tubing in predetermined relation with the wound patterns in combination with pre-set means for rendering the control means inoperative for predetermined repeated periods to ensure that the cuts will be made only at such surplus trim portions that each bit cut off includes features comprising at least one unitary pattern and one surplus trim portion, and means for cutting up the bites to form at least one container of predetermined length from each bite so that the bites are cut up to form containers with each unitary pattern in substantial registry with a container.

7. Apparatus as claimed in claim 1 wherein the tubing is continuously traversed and wherein the control means comprises a regulating device for varying the timing relationship between the movement of the cutter mechanism and the continuous movement of the tubing for timing cuts by reference to control features, and electrical means incorporating a detector arranged to receive impulses from the control features and said pre-set means which are arranged to be operated by the impulses to render the regulating device operative to vary said timing relationship between the movement of the cutter mechanism and the continuous movement of the tubing for timing cuts by reference to control features and inoperative for said predetermined repeated periods such as to avoid varying said timing during the production of lengths of tubing having therein at least one of said control features not referred to in varying said timing.

8. Apparatus as claimed in claim 4 wherein the regulating device comprises a releasable connection between the cutter and an operating member therefor through the medium of which the movement of the cutter is initiated with reference to control features, said pre-set means being arranged to be operated by the impulses to establish the releasable connection and initiate the movements of the cutter and to maintain the releasable connection broken for said predetermined repeated periods to avoid initiating the movement of the cutter during the production of lengths of tubing having therein at least one of said control features not referred to in establishing the releasable connection.

9. Apparatus as claimed in claim 5 wherein the cutter mechanism comprises an adjustable cutter head, a rotatable cam device for moving the cutter head and drive means for the cam device, and the releasable connection being an electrically operated detent for releasably connecting the cam means to the drive means by an impulse from the detector.

10. Apparatus as claimed in claim 1 wherein the control means comprises a regulating device capable of responding to control features on the strip for regulating cutting, and the pre-set means comprises a timed control device for rendering said regulation means responsive to control features at certain times and non-responsive at other times, and including a detector to observe control features, said timed control device being adapted to render said regulating device operative immediately before a control feature arrives at said detector and for rendering the regulating device inoperative at a suitable time after said control feature has passed said detector, and for retaining said regulating means inoperative until it is desired for the regulation device to be operated by another control feature.

11. Apparatus as claimed in claim 10 wherein said regulation device is normally in an operative state, said timed control device being arranged to render said regulation device inoperative for desired periods.

12. Apparatus as claimed in claim 11 wherein said timed control device includes means for varying the duration of the period during which the regulating means are in the operative state.

13. Apparatus as claimed in claim 10 wherein said regulation device is normally in an inoperative state and said timed control device is arranged to render said regulation device operative for a desired period.

14. Apparatus as claimed in claim 10 wherein the regulation device comprises a main electrical circuit operable by control features on the strip, said main circuit comprising contacts and means for actuating said contacts to effect a regulation and a second pair of contacts, and there being actuating means comprising a secondary electrical circuit for actuating said second pair of contacts, said secondary circuit being responsive to movement of the cutter mechanism.

15. Apparatus as claimed in claim 14 and wherein said actuating means comprises a device cooperating with the ends of the moving tubing.

16. Apparatus as claimed in claim 10 wherein the regulating device comprises a photo-electric cell for observing control features, a gas-filled relay valve normally biased to a non-conducting state, means for amplifying impulses from said photo-electric cell and imposing them on the grid of said relay valve and thereby rendering said valve conducting, a high speed magnetic relay in the anode circuit of said relay valve, said relay being adapted on operation to regulate cutting, and having time control means comprising a pair of contacts in the anode circuit, a subsidiary circuit, contacts in said subsidiary circuit operable by movement of said cutting means, an electro-magnetic relay in said subsidiary circuit arranged to operate said contacts in the anode circuit, and adjustable time lag means in said subsidiary circuit for delaying operation of the electro-magnetic relay operating the anode circuit contacts.

17. Apparatus as claimed in claim 1 wherein the control features and surplus trim portions are combined in diagonal marks on the strip and appear as circumferential bands on the tubing.

References Cited in the file of this patent
UNITED STATES PATENTS

| | | |
|---|---|---|
| 1,698,264 | Hawkins | Jan. 8, 1929 |
| 1,709,369 | Ostrander | Apr. 16, 1929 |
| 2,051,922 | Vogt | Aug. 25, 1936 |
| 2,199,708 | Maxfield | May 7, 1940 |
| 2,249,820 | Gullikson | July 22, 1941 |
| 2,277,579 | Burger | Mar. 24, 1942 |
| 2,401,396 | Wolfner | June 4, 1946 |
| 2,623,445 | Robinson | Dec. 30, 1952 |